12) United States Patent
Park (10) Patent No.: US 10,026,194 B2
(45) Date of Patent: Jul. 17, 2018

(54) APPARATUS AND METHOD FOR MEASURING MAIL SIZE AND ACQUIRING MAIL INFORMATION (71) Applicant: Electronics and Telecommunications Research Institute, Daejeon (KR)

(72) Inventor: Moon Sung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1029 days.

(21) Appl. No.: 14/329,371

(22) Filed: Jul. 11, 2014

(65) Prior Publication Data
US 2015/0199569 A1    Jul. 16, 2015

(30) Foreign Application Priority Data

Jan. 14, 2014  (KR) .................. 10-2014-0004437

(51) Int. Cl.
| G01B 5/02 | (2006.01) |
| G01B 5/14 | (2006.01) |
| G01B 7/02 | (2006.01) |
| G01B 7/14 | (2006.01) |
| G01B 11/02 | (2006.01) |
| G01B 11/14 | (2006.01) |
| G01B 13/02 | (2006.01) |
| G01B 21/02 | (2006.01) |
| G01C 22/00 | (2006.01) |
| G06T 7/60 | (2017.01) |
| G06Q 10/06 | (2012.01) |

(Continued)

(52) U.S. Cl.
CPC ............... *G06T 7/602* (2013.01); *B07C 5/16* (2013.01); *B07C 5/342* (2013.01); *G06Q 10/06* (2013.01)

(58) Field of Classification Search
CPC .......... B07C 5/16; B07C 5/342; G06Q 10/06; G06T 7/602
See application file for complete search history.

(56) References Cited

U.S. PATENT DOCUMENTS 3,744,915 A * 7/1973 Sick ..................... G01B 11/02
250/559.26
3,997,270 A * 12/1976 Suzuki .................. G01B 11/04
250/223 R (Continued)

FOREIGN PATENT DOCUMENTS

| KR | 2003-0004975 | 1/2003 |
| KR | 2003-0062774 | 7/2003 |

*Primary Examiner* — David M Gray
*Assistant Examiner* — Geoffrey T Evans
(74) *Attorney, Agent, or Firm* — Nelson Mullins Riley & Scarborough LLP; Anthony A. Laurentano (57) ABSTRACT Provided are an apparatus and method for measuring a mail size and acquiring mail information. The apparatus and method measure a mail size, recognize or read out specific information extracted from image information of a photographed mail, and acquire information necessary for receiving and delivering the mail. Accordingly, a height and length of a mail can be efficiently measured a narrow space, and an accuracy of the measurement can be enhanced. When specific information is extracted from photographed mail image information, information necessary for receipt and delivery of a mail can be more easily acquired by using a method of reading out or recognizing the extracted specific information.

16 Claims, 5 Drawing Sheets

(51) Int. Cl.
*B07C 5/342* (2006.01)
*B07C 5/16* (2006.01)

(56) References Cited

U.S. PATENT DOCUMENTS

| | | | | |
|---|---|---|---|---|
| 5,719,678 | A * | 2/1998 | Reynolds | G01B 11/00 |
| | | | | 235/383 |
| 6,614,928 | B1 | 9/2003 | Chung et al. | |
| 6,798,528 | B1 * | 9/2004 | Hartman | G01B 11/04 |
| | | | | 356/625 |
| 6,880,758 | B2 | 4/2005 | Park et al. | |
| 2003/0127518 | A1 * | 7/2003 | Park | G06K 7/14 |
| | | | | 235/462.25 |
| 2007/0181685 | A1 * | 8/2007 | Zhu | B82Y 15/00 |
| | | | | 235/454 |
| 2008/0301065 | A1 | 12/2008 | Fajour | |
| 2013/0248593 | A1 * | 9/2013 | Bonner | G06K 9/00 |
| | | | | 235/375 |
| 2015/0199785 | A1 * | 7/2015 | Park | G06Q 50/32 |
| | | | | 705/406 |
| 2015/0310242 | A1 * | 10/2015 | Wehrle | G06K 7/10732 |
| | | | | 235/470 |
| 2017/0363411 | A1 * | 12/2017 | Nagahama | G01B 9/02015 |
| 2018/0058839 | A1 * | 3/2018 | Hatstat | G01B 11/00 |

\* cited by examiner

APPARATUS AND METHOD FOR MEASURING MAIL SIZE AND ACQUIRING MAIL INFORMATION

CROSS-REFERENCE TO RELATED APPLICATIONS

This application claims priority to and the benefit of Korean Patent Application No. 10-2014-0004437, filed on Jan. 14, 2014, the disclosure of which is incorporated herein by reference in its entirety.

TECHNICAL FIELD

The present invention relates to an apparatus and method for measuring a mail size and acquiring mail information, and more particularly, to an apparatus and a method, which measure a size a user's mail and acquire mail information so as to automatically receive the user's mail.

BACKGROUND

A prior patent document (Korean Patent Publication No. 10-2003-0004975) relates to an intelligent unmanned mail acceptance system that executes, for post offices, stamp sale work and various mail receipt works, such as general mails, registered mails, express mails, and international mails, and public relations work by using high-tech image recognition and mechatronics technology. A customer inserts a general mail or a small parcel mail (which is desired to send) through an automatic door, and when the customer selects a desired kind of post service by using a touch screen, by using two CCD cameras based on a stereo type, the intelligent unmanned mail acceptance system automatically measures a weight and size of a mail, calculates postage on the basis of the measured weight and size of the mail, and displays the customer's selections and the calculated postage to the customer.

When the customer pays for the displayed postage with coins, bills, or a card, the intelligent unmanned mail acceptance system printing-outputs a label that indicates a stamp substitute charge stamp, an express mail, or a registered mail. When the customer attaches the printing-output materials to the mail and again inserts the main with the printing-output materials attached thereto, the mail is automatically and finally inserted into a mail storage box included in the intelligent unmanned mail acceptance system.

The intelligent unmanned mail acceptance system is used as a method in which a weight of a mail is measured by a general scale, postage is calculated based on the measured weight, and the mail is received. The intelligent unmanned mail acceptance system uses a method in which a width value and height value of an upper surface of a mail are calculated based on four corner points by using two or more image cameras, for measuring a size of the mail. Also, when an image of a side surface is accurately acquired, a calculation result of a height value can be provided. A body of an intelligent unmanned mail acceptance apparatus has a size in which a front width is 1,900 mm, a front height is 1,800 mm, a front and rear depth is 800 mm, and has a self-supporting structure which is configured with three parts such as a left part, a central part, and a right part. Considering the width of total 1,900 mm, a width and height of a central part, and a size of a mail inserting port, the intelligent unmanned mail acceptance system receives only small mails (depth of about 270 mm*width of about 180 mm*height of about 150 mm), and two or more cameras are installed in an upper space for measuring a height of a mail.

Moreover, the intelligent unmanned mail acceptance system needs a large space for installing two or more cameras used to measure a size of a mail. Also, since the intelligent unmanned mail acceptance system combines acquired images to calculate a size of a mail, much time is expended, and a large error of a size measurement result occurs due to the size of the mail and qualities of the acquired images.

That is, the intelligent unmanned mail acceptance system cannot accurately measure sizes of various mails in a small space.

SUMMARY

Accordingly, the present invention provides an apparatus and method for measuring a mail size and acquiring mail information, which measure a mail size, recognize or read out specific information extracted from image information of a photographed mail, and acquire information necessary for receiving and delivering the mail.

The present invention also provides an apparatus and method for measuring a mail size and acquiring mail information, which control a position of a camera for acquiring a mail image so as to recognize and read out a mail size and an address region and barcode printing region of a mail in a stage of accepting, delivering, and receiving the mail in an unmanned post office.

The present invention also provides an apparatus and method for measuring a mail size and acquiring mail information, which minimize a size measurement error of a mail, extract a region of interest (ROI) information based on a mail image acquired for size measurement to enable recognition, encrypt and store an extracted mail image, decrypt and provide an encrypted image file in order for a customer to check an external appearance state of a mail.

In one general aspect, an apparatus for measuring a mail size and acquiring mail information includes: a plurality of height measurement sensor modules configured to, when a mail is placed in a weight measurement space with a reflective plate installed therein, sense position information used to measure a size of the mail by using the reflective plate; a height value generation controller configured to calculate a height value of the mail, based on the position information sensed by the plurality of height measurement sensor modules; and a mail information generator configured to extract a barcode and an address region from an image of the mail acquired by a camera, read out the barcode from the extracted barcode and address region to recognize an address, and generate mail information.

In another general aspect, a method of measuring a mail size and acquiring mail information for receiving a mail through a mail acceptance window of an unmanned post office includes: when a mail is placed in a weight measurement space with a reflective plate installed therein, measuring a size of the mail by using a plurality of sensors and the reflective plate; extracting a barcode and an address region from an image of the mail acquired by a camera; and reading out the barcode and recognizing an address from the extracted barcode and address region to acquire mail information.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
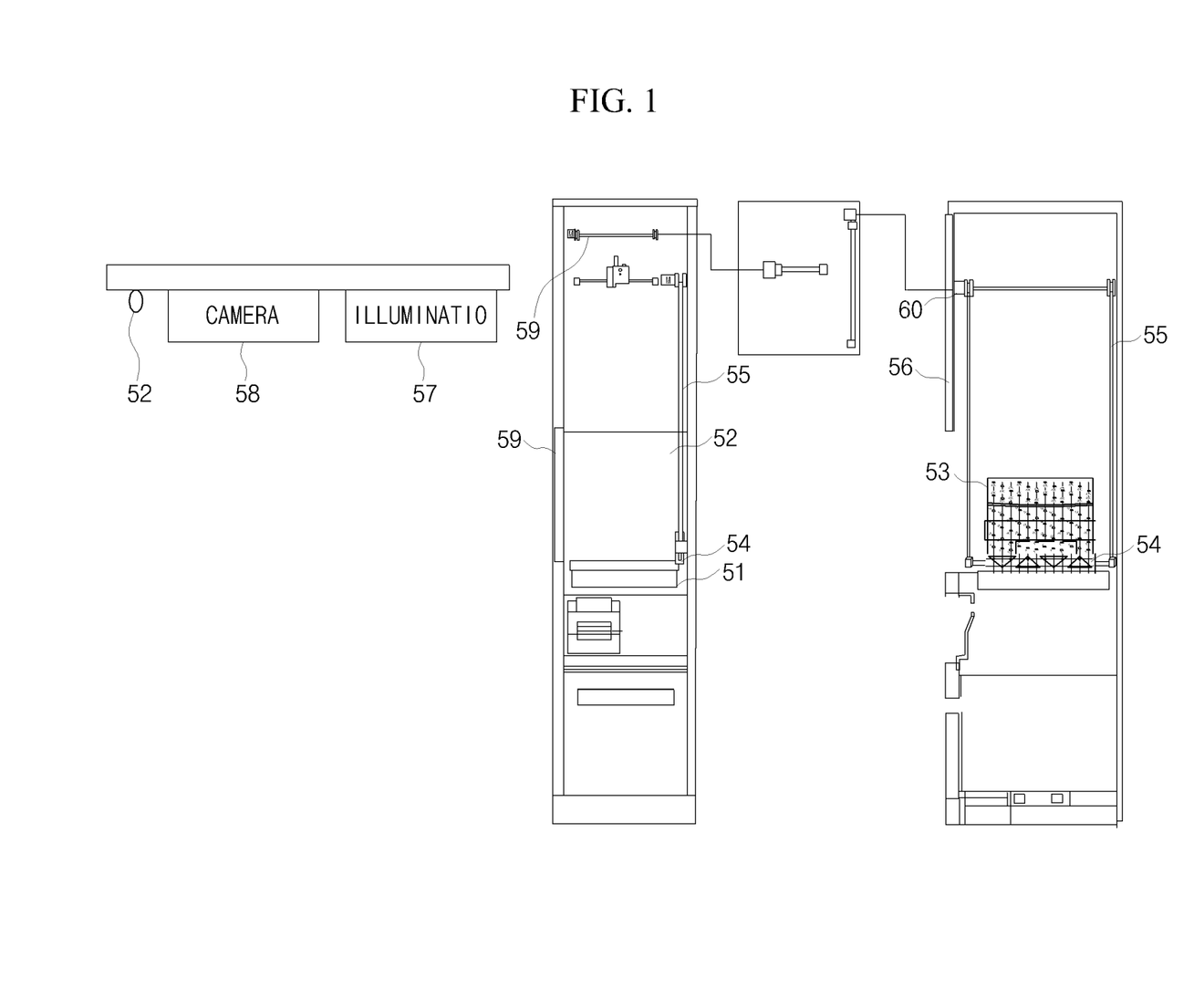
FIG. 1 is a diagram for describing a concept of an apparatus for measuring a mail size and acquiring mail information according to an embodiment of the present invention.
Figure 2:
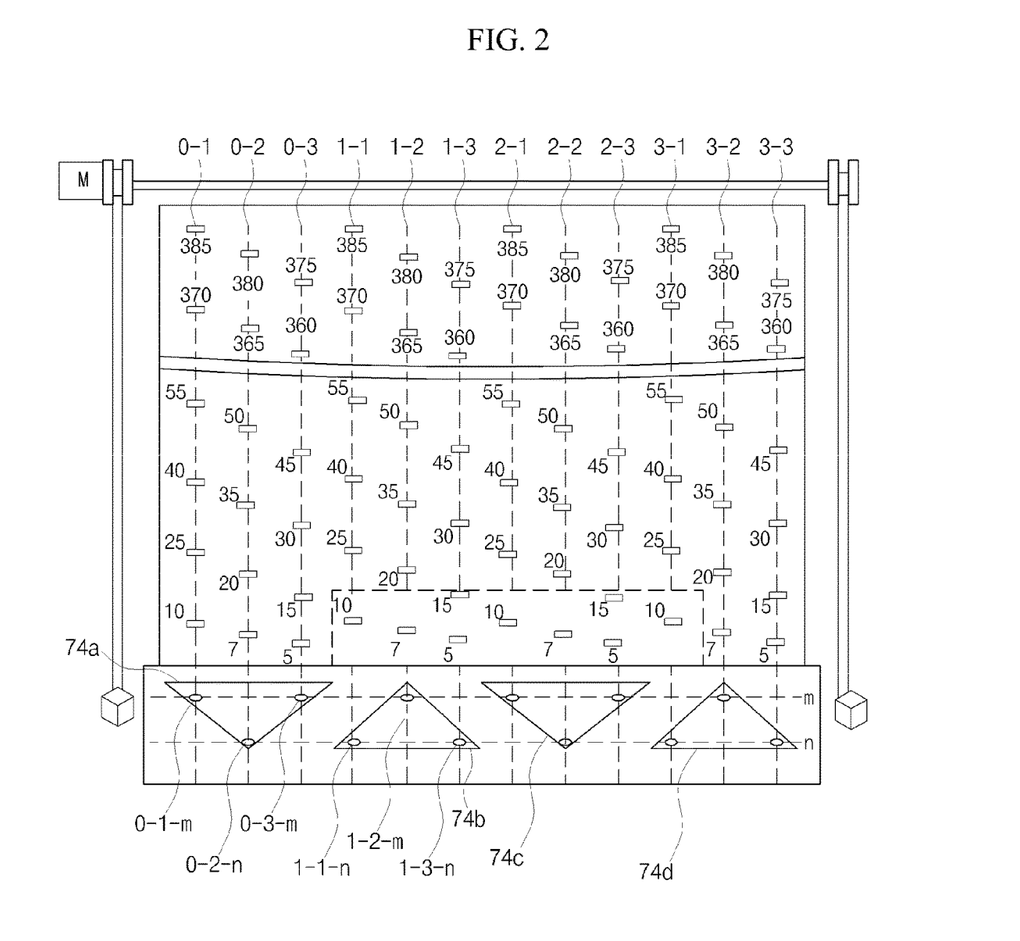
FIG. 2 is a diagram for describing a height measurement sensor module and a reflective plate according to an embodiment of the present invention.
Figure 3:
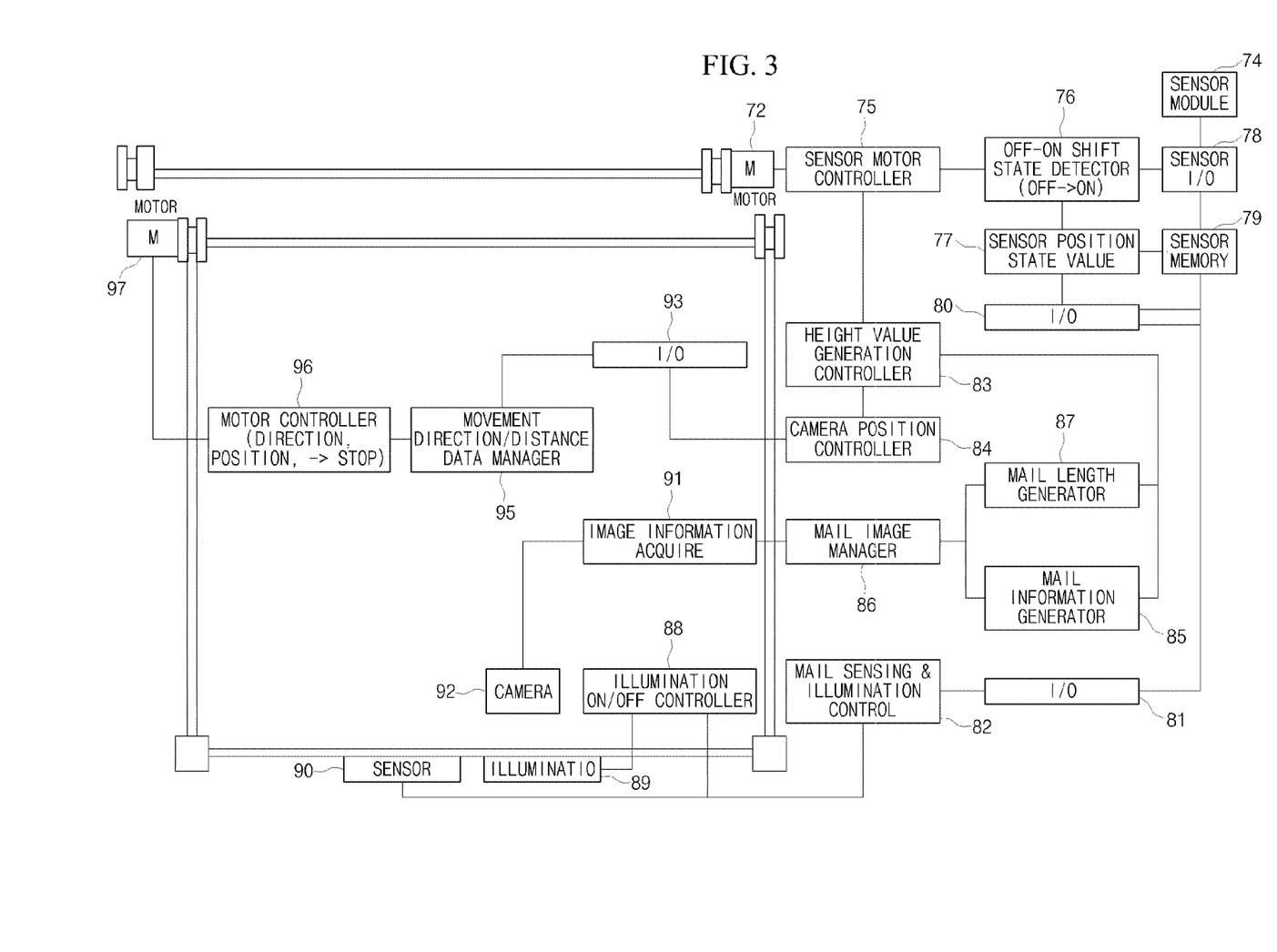
FIG. 3 is a diagram for describing an apparatus for measuring a mail size and acquiring mail information according to an embodiment of the present invention.
Figure 4:
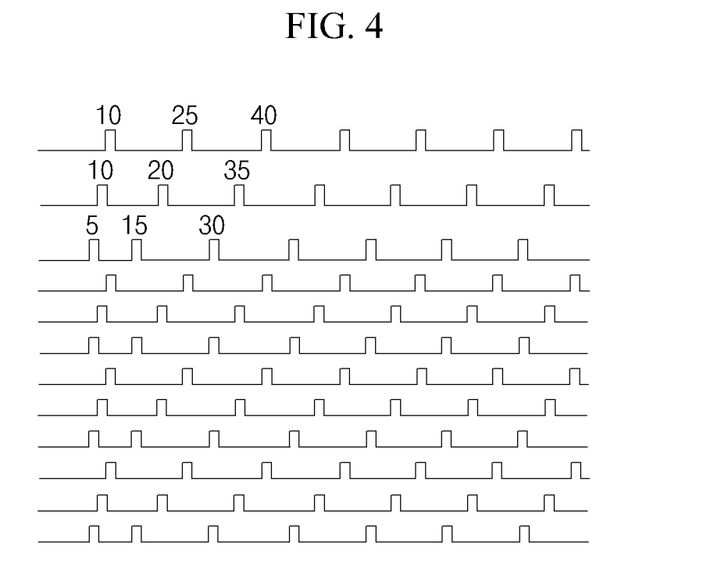
FIGS. 4 and 5 are diagrams for describing a sensing signal as a sensing result of a sensor according to an embodiment of the present invention.
Figure 5:
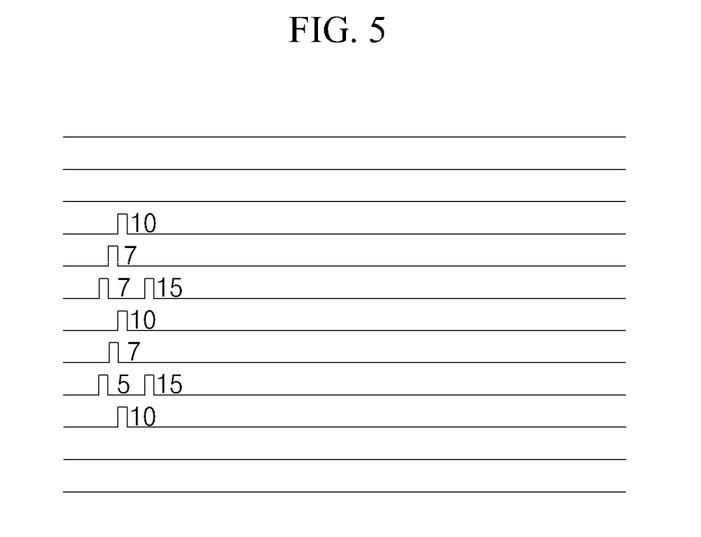

FIG. 1 is a diagram for describing a concept of an apparatus for measuring a mail size and acquiring mail information according to an embodiment of the present invention. FIG. 2 is a diagram for describing a height measurement sensor module and a reflective plate according to an embodiment of the present invention. FIG. 3 is a diagram for describing an apparatus for measuring a mail size and acquiring mail information according to an embodiment of the present invention. FIGS. 4 and 5 are diagrams for describing a sensing signal as a sensing result of a sensor according to an embodiment of the present invention.

As illustrated in FIG. 1, the apparatus for measuring a mail size and acquiring mail information according to an embodiment of the present invention operates as follows.

When a user lays a mail in a weight measurement space for receiving the mail through a mail receipt box, the apparatus for measuring a mail size and acquiring mail information measures the weight of the mail by using a scale 51, and simultaneously determines whether the mail is placed in the weight measurement space, by using an object sensor 52 which is installed at an upper portion of the weight measurement space.

When it is determined by the object sensor 52 that the mail is placed in the weight measurement space, the apparatus for measuring a mail size and acquiring mail information controls a motor 60 to move a height measurement sensor module 54 in a direction from a bottom to a top of the mail.

For example, the apparatus for measuring a mail size and acquiring mail information controls the motor 60 to move the height measurement sensor module 54 so that sensors included in the height measurement sensor module 54 senses an entirety of a reflective plate 53, and acquires a state value from the sensors to store the state value in a temporary memory.

Moreover, the apparatus for measuring a mail size and acquiring mail information checks whether the sensors included in the height measurement sensor module 54 sense all of a plurality of columns into which the reflective plate 53 is divided. When it is checked that the sensors included in the height measurement sensor module 54 sense all the columns of the reflective plate 53, the apparatus for measuring a mail size and acquiring mail information generates a control signal for stopping the height measurement sensor module 54, transfers the generated control signal to the motor 60 so that the motor 60 stops the height measurement sensor module 54, and acquires the state value stored in the temporary memory.

The apparatus for measuring a mail size and acquiring mail information calculates a height value of the mail on the basis of the state values of the sensors, included in the height measurement sensor module 54, corresponding to the respective columns of the reflective plate 53, and calculates the maximum value and an average value on the basis of a plurality of the calculated height values.

When the height value of the mail is calculated, the apparatus for measuring a mail size and acquiring mail information turns on an illumination of a camera, and controls the motor 60 to move the height measurement sensor module 54 to a lowermost portion (or upper end) of the reflective plate 53. When a movement of the height measurement sensor module 54 is completed, the apparatus for measuring a mail size and acquiring mail information stops the motor 60.

When the movement of the height measurement sensor module 54 is completed and thus the motor 60 is stopped, the apparatus for measuring a mail size and acquiring mail information transfers the calculated height value of the mail to a movement control module 59 of a camera module for acquisition of a mail image, and calculates a difference value between a current position value of a camera (included in the camera module) and the calculated height value of the mail.

The apparatus for measuring a mail size and acquiring mail information controls the movement control 59 of the camera module to move the camera by a reference height value, which enables a text and barcode of a mail image to be read out, so that a constant distance between a top of the mail and the camera is maintained.

When the camera moves by the calculated height value and then is stopped, the apparatus for measuring a mail size and acquiring mail information acquires a mail image by using the camera, and finds and reads out a barcode position from the acquired mail image.

The apparatus for measuring a mail size and acquiring mail information transmits the acquired mail image to an operation management apparatus through an integration control system so that the acquired mail image is used for the operation management apparatus to provide an additional service. In the above-described operation, the height measurement sensor module 54 is installed at the left or right of the weight measurement space, and the columns of the reflective plate 53 are arranged to have a constant size and interval. In dividing one the reflective plate 53 into the plurality of columns, height differences between the columns are set at certain intervals, and at least three or four sensors are provided in correspondence with each height measurement sensor module. Therefore, a relation table in which height values respectively sensed (acquired) by the sensors corresponding to the respective columns differ is written and used for a reference position value.

As illustrated in FIG. 2, a sensor reflective plate 70 is divided into a plurality of columns 0-1, 0-2, 0-3, 1-1, 1-2, 1-3, 2-1, 2-2, 2-3, 3-1, 3-2 and 3-3 at specific intervals. In the plurality of columns 0-1, 0-2, 0-3, 1-1, 1-2, 1-3, 2-1, 2-2, 2-3, 3-1, 3-2 and 3-3, a specific position value is previously set and registered. Except for a position value for identifying a general mail standard, an interval between adjacent columns among the plurality of columns 0-1, 0-2, 0-3, 1-1, 1-2, 1-3, 2-1, 2-2, 2-3, 3-1, 3-2 and 3-3 is set as the same interval, and thus, the columns are identified by the sensors.

For example, 10, 25, 40, 55, . . . , 370, and 385 are previously set and registered as a specific position value of the column 0-1, and 7, 20, 35, 50, . . . , 365, and 380 are previously set and registered as a specific position value of the column 0-2. Also, 5, 15, 30, 45, . . . , 360, and 375 are previously set and registered as a specific position value of the column 0-3.

A plurality of height measurement sensor modules 74a to 74d are arranged in parallel. The height measurement sensor module 74a includes three sensors 0-1-$m$, 0-2-$n$ and 0-1-$m$ which are arranged in units of three columns 0-1, 0-2 and 0-3 and in units of two or more rows (m, n). The sensors 0-1-$m$, 0-2-$n$ and 0-1-$m$ are arranged at certain intervals so as not to cause interference, and respectively sense the columns 0-1, 0-2 and 0-3 corresponding thereto.

Each of the sensors 0-1-$m$, 0-2-$n$ and 0-1-$m$ senses the reflective plate 70 while moving according to a movement of the height measurement sensor module, thereby acquiring the number of specific position values of the reflective plate 70. The apparatus for measuring a mail size and acquiring mail information calculates the height value of the mail, based on the acquired number of specific position values of the reflective plate 70.

Each of the height measurement sensor modules 74a to 74d may include two or more sensors. In the present invention, each of the height measurement sensor modules 74a to 74d includes two or more sensors. Also, each of the height measurement sensor modules 74a to 74d is connected to an input/output (I/O) interface that transfers a state value, sensed by a corresponding sensor, to the outside. A turn-on value and a turn-off value are acquired by each sensor, and are simultaneously stored in a temporary memory.

In order to calculate the height value of the mail, each of the height measurement sensor modules 74a to 74d acquires signals while moving from a bottom to a top of the reflective plate 73, the apparatus for measuring a mail size and acquiring mail information calculates the height value of the mail on the basis of the number of the acquired signals. In order to calculate a size of the mail, namely, measure a weight and size of the mail, when the mail is placed in the weight measurement space, namely, on a weight and size measurer, the apparatus for measuring a mail size and acquiring mail information calculates a width of a face (a gray rectangular shape), matching the sensors included in the height measurement sensor modules 74a to 74d, as a size.

For example, as illustrated in FIG. 3, the apparatus for measuring a mail size and acquiring mail information includes a sensor module 74, a sensor motor controller 75, a sensor memory 79, a height value generation controller 83, a mail information generator 85, a mail image manager 86, a mail length generator 87, a sensor 90, and an image information acquirer 91.

A mail is laid on the weight and size measurer, and when the mail is sensed by the sensor 90 installed on the weight and size measurer, the sensor motor controller 75 drives the motor 72. When an off-on shift state detector 76 senses that turn-off states of all sensors continuously occur twice or more in a height value of the mail, the sensor motor controller 75 stops driving of the motor 72, and a value acquired from each sensor is stored in the sensor memory 79. The height value generator controller 83 reads a value stored in the sensor memory 79 to calculate a height value of the mail, namely, calculates the height value of the mail on the basis of a sensor position state value 77 that is the value read from the sensor memory 79. When the calculation of the height value is completed, the motor 72 is driven to move the height measurement sensor module 54 (i.e., the sensor module 74) to a start point of the reflective plate 73, and when the height measurement sensor module 54 reaches a stop point, the driving of the motor 72 is stopped, thereby enabling a height of a next mail to be measured.

An operation, in which the apparatus for measuring a mail size and acquiring mail information calculates a height value of a mail on the basis of values acquired by sensors, will now be described in detail.

When all the sensors are in a turn-off state, the apparatus for measuring a mail size and acquiring mail information calculates a height value of a mail as 0.

When the number of turned-on sensors is one, as shown in the following Table 1, the apparatus for measuring a mail size and acquiring mail information calculates the height value of the mail as an initial position value B of the reflective plate to return the calculated value. When the number of turned-on sensors is two or more, as expressed in the following Equation (1), the apparatus for measuring a mail size and acquiring mail information calculates the height values by sensor of the mail, and stores the calculated height values in a temporary storage.

TABLE 1

| Module Number | m Row | n Row | On Number (A) | Initial Position Value (B) of Reflective Plate | Initial Position Value + Second Position Value of Reflective Plate | Position Value Interval (D) of Reflective Plate | Height Value (H) of Mail |
|---|---|---|---|---|---|---|---|
| 74a | 0-1-m | | | 10 | | | |
| | | 0-2-n | | 7 | | | |
| | 0-3-m | | | 5 | | | |
| | | 1-1-n | | 10 | | | |

TABLE 1-continued

| Module Number | m Row | n Row | On Number (A) | Initial Position Value (B) of Reflective Plate | Initial Position Value + Second Position Value of Reflective Plate | Position Value Interval (D) of Reflective Plate | Height Value (H) of Mail |
|---|---|---|---|---|---|---|---|
| 74b | 1-2-m | | | 7 | | | |
| | | 1-3-n | | 5 | | | |

$$(C-D)+(A-1)*D \quad (1)$$

The apparatus for measuring a mail size and acquiring mail information searches for height values by sensor of a mail which are stored in the temporary storage, and sets the maximum value of the searched height values of the mail as a final height value of the mail. The apparatus for measuring a mail size and acquiring mail information multiplies the number of turned-on sensors and an interval between adjacent sensors to calculate a width value of the mail, and stores the calculated width value.

When a mail is not sensed by each of the sensors, sensing signals are shown as FIG. 4. When the mail is sensed by each sensor (for example, the sensors 0-1-*m*, 0-2-*n*, 0-3-*m*, 1-1-*n*, 1-2-*m*, 1-3-*n*, and 2-1-*m*), sensing signals are as shown in FIG. 5.

Here, an interval value between adjacent sensors is previously stored as an experiment value which is induced through an experiment in manufacturing the height measurement sensor module, and an error range of a height value and a width value is determined based on an interval between adjacent sensors and a predetermined position value of the reflective plate.

When the height measurement sensor module includes four sensors, a height measurement result set as a reference value has an error of +/−2.5 mm or less. In the case of Table 1, namely, when the height measurement sensor module includes three sensors, the height measurement result has an error of +/−5 mm or less.

That is, in an operation of receiving a mail, when a thickness of the mail is within 5 mm, the mail is classified as a standard mail, and when the thickness of the mail is 5 mm or more, the mail is classified as a nonstandard mail. Each sensor module may include three or four sensors for sensing the thickness of the mail, and a sensor interval is 10 mm to 15 mm.

As described above, since information senses by the height measurement sensor module 54 (i.e., the sensor module 74) is stored in the sensor memory 79, the height value generation controller 83 reads a value stored in the sensor memory 79 to calculate a height value of a mail on the basis of the sensor position state value 77 that is the value read from the sensor memory 79. When the calculation of the height value is completed, the image information acquirer 91 and the mail image manager 86 acquire a mail image, and the mail length generator 87 generates a long length value and a short length value from the acquired mail image. The mail information generator 85 reads out a barcode included in the acquired mail image, which is stored.

When the height value generation controller 83 generates a height value of the mail, an illumination on/off controller 88 turns on an illumination 89, and a movement direction/distance data manager 95 generates a value for moving, by the generated height value, a camera 92 for acquisition of a mail image by using a motor controller 96 for acquisition of an image. In this case, a camera position controller 84 allows a distance between a height of the mail and the camera 92 to become a constant value, and the motor controller 96 drives the motor 97 to move the camera 92.

When a movement of the camera 92 is completed, the motor controller 96 stops the motor 97, and a mail image acquisition single is transferred to the camera 92 through the camera position controller 84 and the image information acquirer 91 so that the camera 92 acquires an image. The movement direction/distance data manager 95 stores a current position value of the camera 92.

When the height value generation controller 83 acquires a height of a next mail, the height value generation controller 83 calculates a difference value between the acquired height of the next mail and a height value of a previous mail. The difference value is moved by a −/+ size value in a traveling direction or an opposite direction by using the camera position controller 84 and the movement direction/distance data manager 95, and thus, a constant distance between a face of the mail and the camera 92 is always maintained.

As described above, when the image information acquirer 91 acquires the mail image, the acquired mail image is stored. The mail image manager 86 binarizes the mail image, and calculates a length of a long side and a length of a short side. The mail image manager 86 reflects an error between an actual measurement value and a measurement value and an error value between a width and height of a camera image, and thus, the mail length generator 87 calculates a length value of a long side and a length value of a short side of the mail.

In order to prevent an error of a generated result value, the apparatus for measuring a mail size and acquiring mail information compares a width of a face (a gray rectangular shape), matching the sensors included in the height measurement sensor module 54 (i.e., the sensor module 74), and a width of a face corresponding to the mail in the acquired image, and when a difference between the compared widths is 10% or more, the apparatus for measuring a mail size and acquiring mail information determines there to be the error of the generated result value. Therefore, the sensor module 74 reflects the acquired value without reflecting the generated result value.

The apparatus for measuring a mail size and acquiring mail information searches for an internal region, including a barcode, of a binarized image to read out the barcode, and the main information generator 85 generates and provides the readout result.

As described above, according to the present invention, a height and length of a mail can be efficiently measured a narrow space, and an accuracy of the measurement can be enhanced. When specific information is extracted from photographed mail image information, information necessary for receipt and delivery of a mail can be more easily acquired by using a method of reading out or recognizing the extracted specific information. In particular, a mail size can be accurately measured, and thus, postage can be accurately calculated. A receipt box or a delivery box is assigned depending on a measured mail size, thereby efficiently receiving or distributing mails. Moreover, photographed mail image information is used for mail quality management of a user and to provide an additional service.

Figure 6:
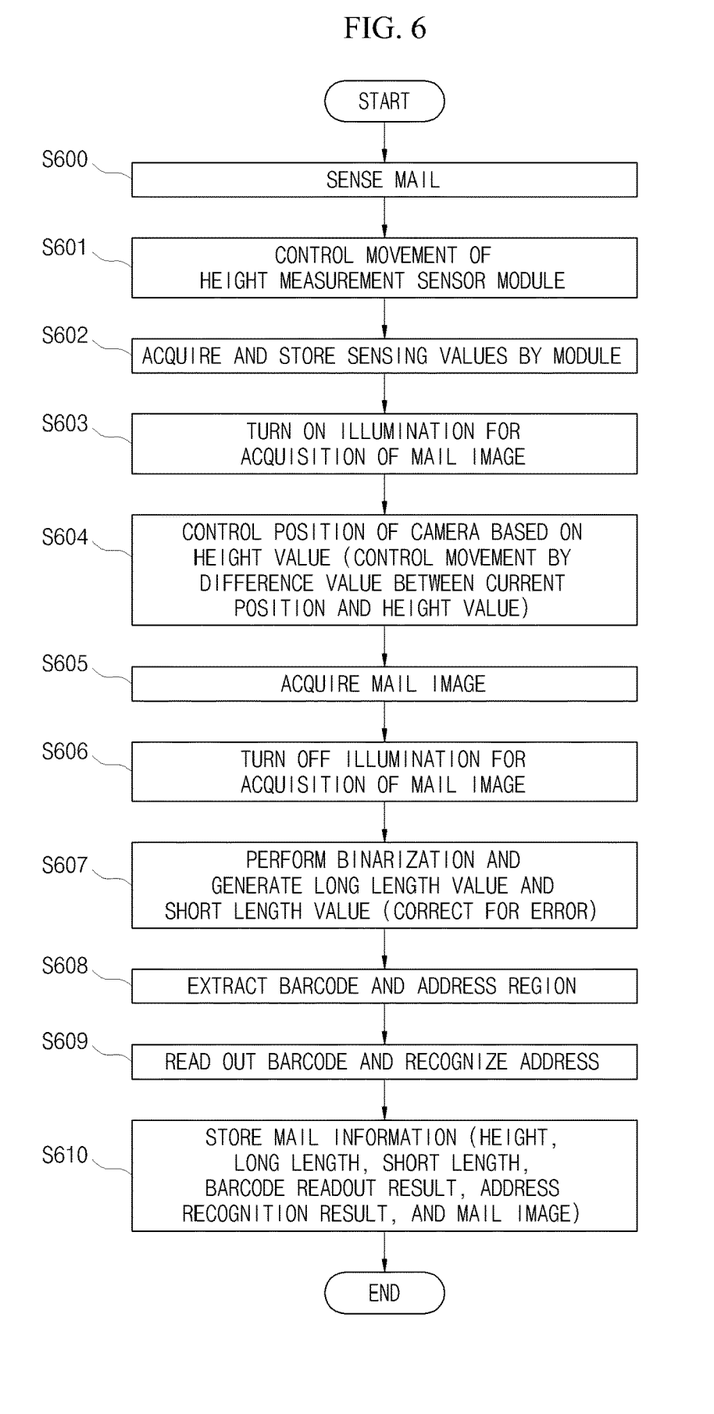
FIG. 6 is a diagram for describing a method of measuring a mail size and acquiring mail information according to an embodiment of the present invention.

Hereinabove, the apparatus for measuring a mail size and acquiring mail information according to an embodiment of the present invention has been described with reference to FIGS. 1 to 5. Hereinafter, a method of measuring a mail size and acquiring mail information according to an embodiment of the present invention will be described in detail with reference to FIG. 6. FIG. 6 is a diagram for describing a method of measuring a mail size and acquiring mail information according to an embodiment of the present invention.

In a method according to an embodiment of the present invention that generates a height value, width value, long length value, and short length value of a mail, generates a barcode of a mail and a mail address recognition result, and stores a mail image, as illustrated in FIG. 6, when a user lays a mail in the weight measurement space for receiving the mail through the mail receipt box, the apparatus for measuring a mail size and acquiring mail information measures the weight of the mail by using the scale 51, and simultaneously determines whether the mail is placed in the weight measurement space, by using an object sensor 52 which is installed at an upper portion of the weight measurement space, in step S600.

When it is determined by the object sensor 52 that the mail is placed in the weight measurement space, the apparatus for measuring a mail size and acquiring mail information controls a motor 60 to move a height measurement sensor module 54 in a direction from a bottom to a top of the mail, in step S601.

For example, the apparatus for measuring a mail size and acquiring mail information controls the motor 60 to move the height measurement sensor module 54 until the sensors included in the height measurement sensor module 54 senses the reflective plate 53, and acquires a state value from the sensors to store the state value in a temporary memory, in step S602.

That is, the apparatus for measuring a mail size and acquiring mail information checks whether the sensors included in the height measurement sensor module 54 sense all of a plurality of columns into which the reflective plate 53 is divided. When it is checked that the sensors included in the height measurement sensor module 54 sense all the columns of the reflective plate 53, the apparatus for measuring a mail size and acquiring mail information generates a control signal for stopping the height measurement sensor module 54, transfers the generated control signal to the motor 60 so that the motor 60 stops the height measurement sensor module 54, and acquires the state value stored in the temporary memory.

Moreover, the apparatus for measuring a mail size and acquiring mail information calculates a height value of the mail on the basis of the state values of the sensors, included in the height measurement sensor module 54, corresponding to the respective columns of the reflective plate 53, and calculates the maximum value and an average value on the basis of a plurality of the calculated height values.

When the height value of the mail is calculated, the apparatus for measuring a mail size and acquiring mail information turns on an illumination of the camera 92 in step S603, and controls the motor 60 to move the height measurement sensor module 54 to a lowermost portion (or upper end) of the reflective plate 53. When a movement of the height measurement sensor module 54 is completed, the apparatus for measuring a mail size and acquiring mail information stops the motor 60.

When the movement of the height measurement sensor module 54 is completed and thus the motor 60 is stopped, the apparatus for measuring a mail size and acquiring mail information transfers the calculated height value of the mail to the movement control module 59 of a camera module for acquisition of a mail image, and calculates a difference value between a current position value of the camera 92 (included in the camera module) and the calculated height value of the mail.

In step S604, the apparatus for measuring a mail size and acquiring mail information controls the movement control 59 of the camera module to move the camera 92 by a reference height value, which enables a text and barcode of a mail image to be read out, so that a constant distance between a top of the mail and the camera 92 is maintained.

When the camera 92 moves by the calculated height value and then is stopped, the apparatus for measuring a mail size and acquiring mail information acquires a mail image by using the camera in step S605, and turns off the illumination of the camera 92, namely, the illumination for acquisition of a mail image in step S606.

In step S607, the mail image manager 86 binarizes the mail image, and calculates a length of a long side and a length of a short side, and reflects an error between an actual measurement value and a measurement value and an error value between a width and height of a camera image, and thus, the mail length generator 87 calculates a length value of a long side and a length value of a short side of the mail.

The apparatus for measuring a mail size and acquiring mail information searches for and extracts a barcode and an address region from the acquired mail image in step S608, reads out the barcode from the extracted address region to recognize an address in step S609, and stores mail information (a height, long length, and short length of the mail, a barcode readout result, an address recognition result, the mail image, etc.) in step S610.

According to the present invention, a height and length of a mail can be efficiently measured a narrow space, and an accuracy of the measurement can be enhanced.

When specific information is extracted from photographed mail image information, information necessary for receipt and delivery of a mail can be more easily acquired by using a method of reading out or recognizing the extracted specific information.

In particular, a mail size can be accurately measured, and thus, postage can be accurately calculated.

A receipt box or a delivery box is assigned depending on a measured mail size, thereby efficiently receiving or distributing mails.

Moreover, photographed mail image information is used for mail quality management of a user and to provide an additional service.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for measuring a mail size and acquiring mail information, the apparatus comprising:
a plurality of height measurement sensor modules configured to, when a mail is placed in a weight measurement space with a reflective plate installed therein, sense position information used to measure a size of the mail by using the reflective plate;
a height value generation controller configured to calculate a height value of the mail, based on the position information sensed by the plurality of height measurement sensor modules; and
a mail information generator configured to extract a barcode and an address region from an image of the mail acquired by a camera, read out the barcode from the extracted barcode and address region to recognize an address, and generate mail information, wherein,
the reflective plate is divided into a plurality of columns,
except for an initial position value used to identify a general mail standard, position values of the plurality of columns are arranged at the same intervals and registered to be identified by the plurality of height measurement sensor modules, and
the plurality of height measurement sensor modules sense position information of the plurality of columns into which the reflective plate is divided.

2. The apparatus of claim 1, wherein,
the plurality of height measurement sensor modules are arranged in parallel with each other, and each of the plurality of height measurement sensor modules comprises three sensors arranged based on a combination of a column and a row,
the three sensors are arranged at certain intervals not to cause interference therebetween, and move in a direction from a bottom to a top of the mail to sense columns corresponding thereto, and
the height value generation controller calculates the height value of the mail, based on number of position values of columns respectively acquired by the three sensors.

3. The apparatus of claim 1, further comprising a movement control module configured to move the camera by a reference height value which enables a text and barcode of the mail image to be read out,
wherein,
the height value generation controller calculates a difference value between the height value of the mail and a current position value of the camera, and
the mail information generator controls the movement control module based on the calculated difference value, acquires the image of the mail by using the camera, and searches for a barcode position and an address region from the acquired image of the mail to read out the barcode and recognize an address.

4. The apparatus of claim 1, wherein,
when values acquired by a plurality of sensors included in the plurality of height measurement sensor modules correspond to those when the number of times the plurality of sensors are all turned off is equal to or greater than a predetermined number, movement of the plurality of height measurement sensor modules is stopped, and the values acquired from the plurality of sensors are stored in a sensor memory, and
the values stored in the sensor memory are read, and when the calculation of the height value of the mail is completed, the plurality of height measurement sensor modules are moved to a start point of the reflective plate to allow a height of a next mail to be measured.

5. The apparatus of claim 4, wherein,
when the values acquired by the plurality of sensors correspond to those when the plurality of sensors are all turned off, the height value of the mail is calculated as 0,
when the values acquired by the plurality of sensors correspond to those when one sensor is turned on, the height value of the mail is calculated as an initial position value "B" of the reflective plate,
when the values acquired by the plurality of sensors correspond to those when two or more sensors are turned on, the height value of the mail is calculated as $(C-D)+(A-1)*D$, where A denotes number of turned-on sensors, B denotes the initial position value of the reflective plate, C denotes the initial position value of the reflective plate+a second position value of the reflective plate, and D denotes a position value interval of the reflective plate.

6. The apparatus of claim 1, wherein,
based on information sensed by a plurality of sensors included in the plurality of height measurement sensor modules, the height values by sensor of the mail are stored,
the stored height values by sensor of the mail are searched for, and a maximum value of the searched height values of the mail is set as a final height value of the mail, and
a width value of the mail is calculated by multiplying a number of turned-on sensors and an interval between adjacent sensors.

7. The apparatus of claim 6, wherein,
an error range of the height value and width value of the mail is determined based on a predetermined interval between adjacent sensors and a predetermined position value of the reflective plate,
when each of the plurality of height measurement sensor modules include three sensors, an error value of the height value and width value of the mail is equal to or less than a reference error value, and
in an operation of receiving a mail, when a thickness of the mail is less than a reference thickness, the mail is classified as a standard mail, and when the thickness of the mail is equal to or greater than the reference thickness, the mail is classified as a nonstandard mail.

8. The apparatus of claim 1, wherein a position value for moving the camera by the calculated height value of the mail is generated, and based on the generated position value, the camera is moved so that a distance between a height of the mail and the camera becomes a predetermined value.

9. The apparatus of claim 8, wherein,
when movement of the camera is completed, a current position of the camera is stored, and the image of the mail is acquired by using the camera, and
when a height of a next mail is acquired, a difference value with a height value of a previous mail is calculated, and the camera is moved by the calculated − or + difference value in a traveling direction or an opposite direction from the current position to maintain a predetermined distance between the mail and the camera.

10. A method of measuring a mail size and acquiring mail information for receiving a mail through a mail acceptance window of an unmanned post office, the method comprising:
when a mail is placed in a weight measurement space with a reflective plate installed therein, measuring a size of the mail by using a plurality of sensors and the reflective plate;

extracting a barcode and an address region from an image of the mail acquired by a camera; and reading out the barcode and recognizing an address from the extracted barcode and address region to acquire mail information;

wherein the measuring of a size comprises:

moving the plurality of sensors in a direction from a bottom to a top of the mail to sense position information of a plurality of columns into which the reflective plate is divided; and calculating a height value of the mail, based on the sensed position information, wherein except for a position value used to identify a general mail standard, position values of the plurality of columns are arranged at the same intervals and registered.

11. The method of claim 10, wherein the extracting of a barcode and an address region comprises:

calculating a difference value between the height value of the mail and a current position value of the camera; and moving the camera by a reference height value, which enables a text and barcode of the mail image to be read out, so that a distance between the mail and the camera maintains a predetermined distance, to acquire the image of the mail by using the camera, based on the calculation result.

12. The method of claim 10, wherein the measuring comprises:

when values acquired by a plurality of sensors included in the plurality of height measurement sensor modules correspond to those when the number of times the plurality of sensors are all turned off is equal to or greater than a predetermined number, stopping movement of the plurality of sensors;

storing the values acquired from the plurality of sensors in a sensor memory, and reading the values stored in the sensor memory to calculate the height value of the mail;

when the calculation of the height value of the mail is completed, moving the plurality of sensors to a start point of the reflective plate to allow a height of a next mail to be measured.

13. The method of claim 12, wherein the calculating comprises:

when the values acquired by the plurality of sensors correspond to those when the plurality of sensors are all turned off, calculating the height value of the mail as 0;

when the values acquired by the plurality of sensors correspond to those when one sensor is turned on, calculating the height value of the mail as an initial position value "B" of the reflective plate; and when the values acquired by the plurality of sensors correspond to those when two or more sensors are turned on, calculating the height value of the mail as (C−D)+(A−1)*D, where A denotes number of turned-on sensors, B denotes the initial position value of the reflective plate, C denotes the initial position value of the reflective plate+a second position value of the reflective plate, and D denotes a position value interval of the reflective plate.

14. The method of claim 10, wherein the measuring comprises:

storing the height values by sensor of the mail, based on information sensed by a plurality of sensors included in the plurality of height measurement sensor modules;

searching for the stored height values by sensor of the mail, and setting a maximum value of the searched height values of the mail as a final height value of the mail; and multiplying a number of turned-on sensors and an interval between adjacent sensors to calculate a width value of the mail.

15. The method of claim 14, further comprising:

an interval value between adjacent sensors is previously stored as an experiment value which is induced through an experiment, an error range of a height value and a width value is determined based on the interval value between adjacent sensors and a predetermined position value of the reflective plate, and an error value of the height value and width value of the mail is equal to or less than a reference error value depending on a number of measurement sensors, when a thickness of the mail measured by reflecting the error value in receiving the mail is less than a reference thickness, classifying the mail as a standard mail; and when the thickness of the mail is equal to or greater than the reference thickness, classifying the mail as a non-standard mail.

16. The method of claim 10, wherein the extracting of a barcode and an address region comprises:

generating a position value for moving the camera by the calculated height value of the mail; moving, based on the generated position value, the camera so that a distance between a height of the mail and the camera becomes a predetermined value;

when the movement of the camera is completed, storing a current position of the camera, and acquiring the image of the mail by using the camera; and when a height of a next mail is acquired, calculating a difference value with a height value of a previous mail, and moving the camera by the calculated − or + difference value in a traveling direction or an opposite direction from the current position to maintain a predetermined distance between the mail and the camera.

* * * * *